United States Patent [19]
An

[11] Patent Number: 5,281,783
[45] Date of Patent: Jan. 25, 1994

[54] COFFEE HEATING METHOD USING MICROWAVE ENERGY CONTROLLED IN ACCORDANCE WITH THE LEVEL OF WATER AND THE INPUT VOLTAGE OF THE MICROWAVE GENERATING MEANS

[75] Inventor: Seong-Wan An, Kyonggi, Rep. of Korea

[73] Assignee: Samsung Electronics Co., Ltd.,., Suwon, Rep. of Korea

[21] Appl. No.: 783,876

[22] Filed: Oct. 29, 1991

[30] Foreign Application Priority Data

Nov. 2, 1990 [KR] Rep. of Korea ............... 90-17781
May 2, 1991 [KR] Rep. of Korea ............... 91-7135

[51] Int. Cl.$^5$ ............................................. H05B 6/64
[52] U.S. Cl. .................... 219/10.55 M; 219/10.55 E; 426/241; 426/594; 99/DIG. 14
[58] Field of Search ............... 219/10.55 E, 10.55 M, 219/10.55 R; 426/594, 241, 243; 99/451, DIG. 14, 280, 281

[56] References Cited

U.S. PATENT DOCUMENTS 4,381,696  5/1983  Koral ............................ 99/306
4,908,222  3/1990  Yu ............................ 219/10.55 E
5,028,753  7/1991  Shariat ...................... 219/10.55 E

FOREIGN PATENT DOCUMENTS 63-299088  12/1988  Japan .

Primary Examiner—Philip H. Leung
Attorney, Agent, or Firm—Burns, Doane, Swecker & Mathis

[57] ABSTRACT

The present invention relates to a coffee making or heating method for heating water under the control of a microcomputer to ensure the appropriate heating condition of water. The coffee heating method includes a step of heating water by using a high output of a magnetron for a minimum heating time when an amount of water is at a minimum and an input voltage is at a maximum wherein the microcomputer has been set previously with the minimum and maximum heating time; and, a step of heating water by a low output of the magnetron for the maximum heating time when the input voltage is at a minimum and an amount of water is at a maximum, whereby the heating condition of water can be always maintained appropriately. With the coffee heating method, the heating condition of water is controlled automatically without an artificial handling and tasty coffee will be then prepared.

8 Claims, 3 Drawing Sheets

COFFEE HEATING METHOD USING MICROWAVE ENERGY CONTROLLED IN ACCORDANCE WITH THE LEVEL OF WATER AND THE INPUT VOLTAGE OF THE MICROWAVE GENERATING MEANS

BACKGROUND OF THE INVENTION

1. Field of the Invention

The present invention relates to a method of making or heating coffee by using a microwave oven, more particularly, to a coffee heating method which can control a high frequency output of a magnetron mounted in the microwave oven by using a microcomputer having a program capable of controlling the heating condition of water to be used to prepare coffee appropriately to achieve the optimum heating condition of water.

2. Description of the Prior Art

In a conventional coffee making method, a coffee heating vessel as shown in FIG. 1, first, is inserted into a microwave oven (not shown) and water 2 contained in the vessel is then heated by a high frequency output of a magnetron mounted in the microwave oven. Accordingly, air pressure is produced on the top portion of the internal side of the coffee heating vessel. At this time, the heated water is raised upwardly along both water passages 8 on the basis of siphonage and then dropped into a coffee-powdered receptacle 3. Accordingly, coffee powder 4 is melted by the heated water, and the melted coffee is then flowed downwardly through a filtering member 5 and collected at a lower side of the vessel. As a result, the coffee is made.

With the conventional coffee heating or making method, however, coffee is heated for a certain time by using the maximum output of the magnetron without an appropriate measure according to the heating condition of water.

Therefore, if the input voltage supplied to the microwave oven is lower than the rated voltage, water may be not heated sufficiently, thereby only a small quantity of water will be dropped into the receptacle 3 according to the siphonage so that strong coffee is prepared despite of the intention of an user. Alternatively, if the input voltage is higher than the rated voltage, water containing in the vessel is heated very fast and, therefore, a large quantity of water may be dropped into the receptacle 3 so that the consistency of coffee to be melted is weak. Further, if the high voltage is supplied to the microwave oven, the water and the melted coffee may be continuously heated for a predetermined time previously set to the microwave oven after the water has been boiled, thereby coffee runs over from the vessel.

As a result in order to maintain the consistency of coffee appropriately, the user has to control the heating condition of water by using a proper manner, for example, cut-off of the power voltage while observing the heating condition of water.

As another exemplary technique, a composite coffee heating apparatus is disclosed in, for example, Japanese patent laid-open publication No. sho 63-299088, which comprises a power converting portion for converting a dc or ac power into a high frequency power; a dielectric heating portion and induction heating portion operating by the high frequency power supplied from the power converting portion; a tank having a heat absorbing pipe inserted into a heating part of the induction heating portion and a pipe for introducing liquid components flowing through the heat absorbing pipe into a vessel disposed on the heating part of the dielectric heating portion and induction heating portion; and, a control means for selectively inputting the high frequency power to the induction heating portion and for controlling the temperature of the subject to be heated when the high frequency power is supplied to the induction heating portion.

With the coffee heating apparatus constructed as mentioned above, there are advantages that the cost of equipment can be decreased considerably and the change of the vessel is unnecessary in heating and heat-keeping steps, thereby the apparatus is comfortable for handling, but it has disadvantages that the apparatus is complicated in construction and is constructed with a hardware structure to thereby cause an erroneous operation.

SUMMARY OF THE INVENTION

Accordingly, the present invention has been made to improve the aforementioned disadvantages and an object of the present invention is to provide a coffee heating method, which controls appropriately water to be used in an optimum condition by using a microcomputer having a program capable of controlling the heating condition of water.

In order to achieve the above-mentioned object, the present invention provides a coffee heating method, the method comprising: a step of heating water by using a high output of a magnetron for the minimum heating time when an amount of water is at a minimum and an input voltage is at a maximum under a condition that a microcomputer has been set previously with the minimum and maximum heating time; and, a step of heating water by a low output of the magnetron for the maximum heating time when the input voltage is at a minimum and an amount of water is at a maximum, whereby the heating condition of water can be always maintained appropriately.

The above and others objects, features and advantages of the present invention will be apparent from the following description to be understood with reference to the accompanying drawings.

DETAILED DESCRIPTION OF THE PREFERRED EMBODIMENT

Figure 1:
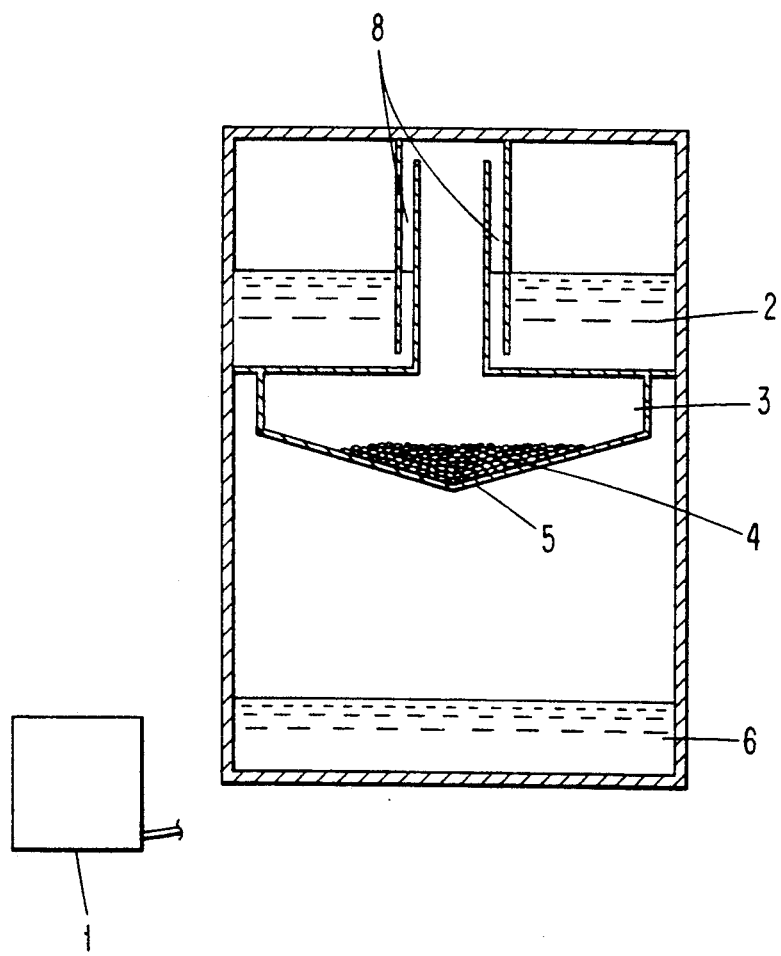
FIG. 1 is a schematic view showing main parts of a coffee heating vessel.

The coffee heating vessel shown in FIG. 1 is adapted to the present invention.

Figure 2:
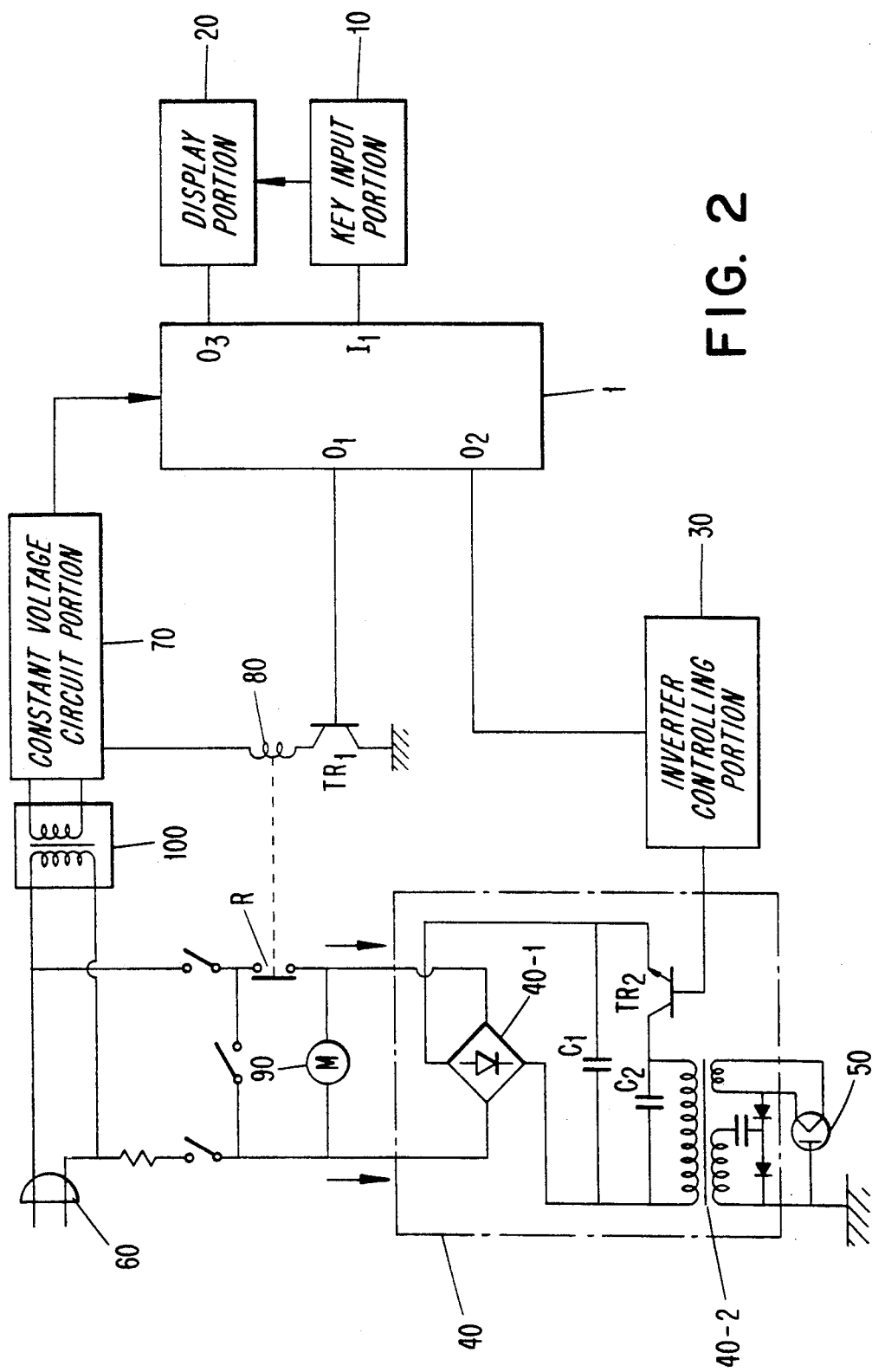
FIG. 2 is a circuit diagram embodying a coffee heating method according to a preferred embodiment of the present invention; and, FIG. 3 is a flowchart of illustrating the operating sequence according to the preferred embodiment of the present invention.

Referring to FIG. 2, reference numeral 1 denotes a microcomputer, 10 denotes a key input portion which inputs key signals into the microcomputer 1, for example, a high output time signal and a low output time signal for heating coffee, and 20 denotes a display portion for displaying the key input signals from the key input portion 10 to indicate the input signal to users.

Moreover, reference numeral 30 denotes an inverter controlling portion which controls the inverter 40 under the control of the microcomputer 1 to control the output of the magnetron 50 depending on the heating condition of water, 60 denotes a power voltage input portion, 70 denotes a constant voltage circuit portion, 80 denotes a relay, 90 denotes a fan motor, and 100 denotes a transformer.

In the coffee heating circuit of the present invention constructed as mentioned above, when a normal ac power voltage is supplied from the power voltage input portion, the power voltage is converted to a voltage necessary to the operation of respective circuits by using the transformer 100. The power voltage thus converted is maintained in a constant voltage by the constant voltage circuit portion 70 and then supplied to the microcomputer 1 so that it performs given functions. Under the condition, that a coffee heating key of the key input portion 10 is depressed, the coffee heating signal is transferred to an input terminal $I_1$ of the microcomputer 1. In this case, the microcomputer 1 outputs at an output terminal $O_3$ the input signal to the display portion 20 to indicate the input signal. Subsequently, the microcomputer 1 outputs at an output terminal $O_1$ a high level signal so as to turn on a transistor TR1 while storing the high output time previously set therein into a counter (not shown).

The relay 80 is activated by the driving voltage supplied from the constant voltage circuit portion 70. Accordingly, a contact R of the relay 80 is connected and thus the power voltage supplied through the power voltage input portion 60 is applied to the fan motor 90 to drive the same. Also, the power voltage is supplied to the inverter power supply portion 40 and then full-wave rectified by a bridge rectifier 40-1, and the rectified voltage is then applied to a transformer 40-2.

Next, the microcomputer 1 outputs at the output terminal $O_2$ the high output signal to the inverter controlling portion 30. The inverter controlling portion 30 outputs an ON/OFF duty signal corresponding to the high output signal to a transistor $TR_2$ of the inverter power supply portion 40 so that the primary voltage of the transformer 40-2 becomes the voltage corresponding to a high output signal.

Meanwhile, if the high output time has been elapsed, the microcomputer 1 stores the low output time previously set therein into the counter (not shown) and outputs at the output terminal $O_2$ the low output signal to the inverter controlling portion 30. Accordingly, the inverter controlling portion 30 converts the aforementioned ON/OFF duty signal into a duty signal corresponding to the low output signal and then supplies the duty signal to the transistor $TR_2$ so that the primary voltage of the transformer 40-2 corresponds to the low output voltage. Therefore, the output level of the magnetron 50 which generates the high frequency can be controlled depending on the high voltage or low voltage supplied to the primary of the transformer 40-2 to maintain the heating condition of water appropriately, as described above.

Figure 3:
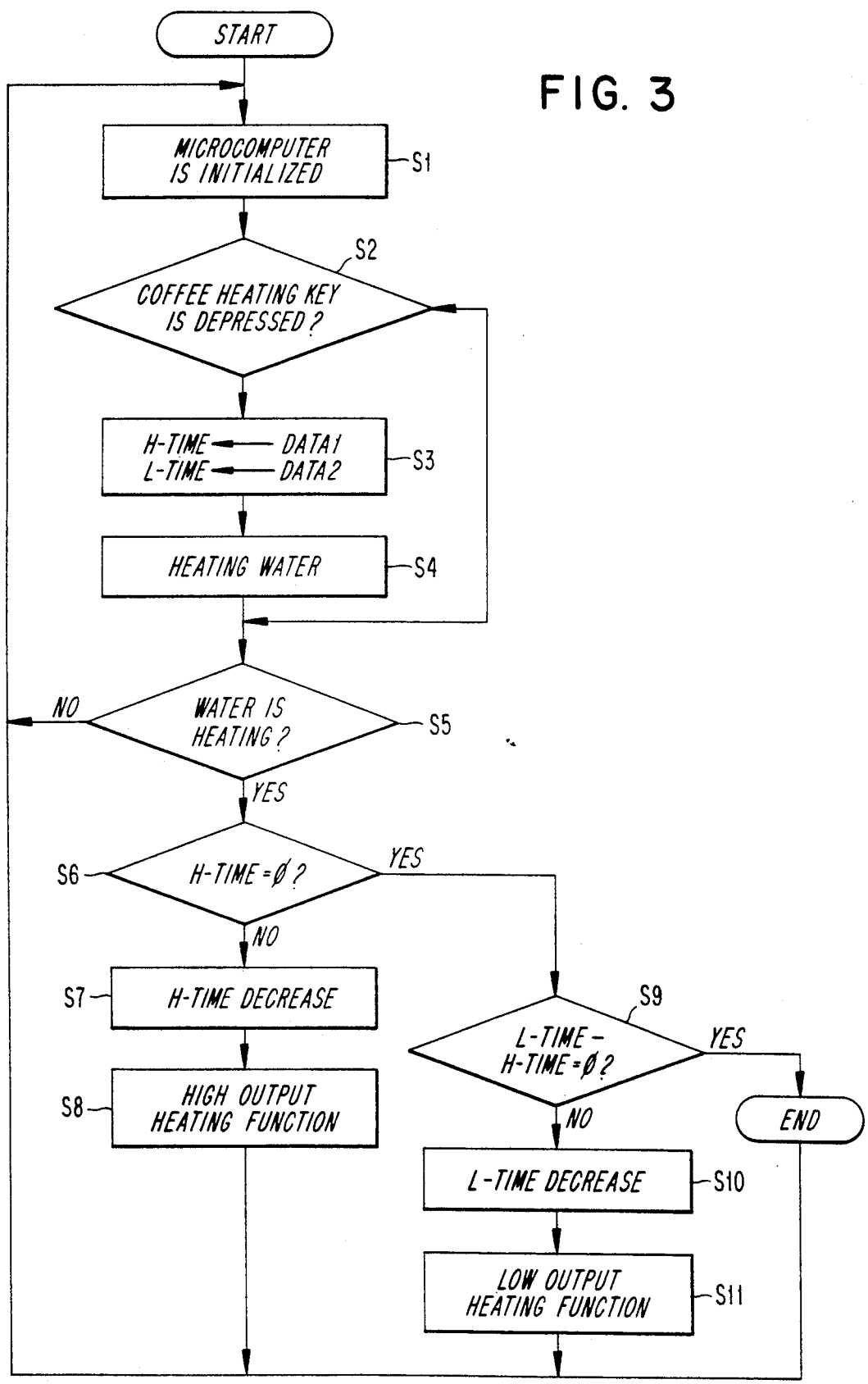

Now, the operating sequence of the coffee heating control circuit according to the present invention will be described, referring to FIG. 3.

Firstly, an appropriate amount of coffee powder 4 and water 2 are prepared in the vessel at a step S1 and the microcomputer 1 is initialized to start the operation of the coffee heating method according to the present invention. Subsequently, the microcomputer 1 determines whether the coffee heating key of the key input portion 10 is depressed or not at a step S2. If the coffee heating key has been depressed, that is, YES, the procedure proceeds to a step S3. At the step S3, the microcomputer 1 stores data 1, that is, the minimum of the water-heating time as a H-time, or data 2, that is, the maximum of the water-heating time as a L-time. The minimum heating time is selected when the input voltage at a maximum and an amount of water is at a minimum, whereas the maximum heating time is selected when the input voltage is at a minimum and an amount of water is at a maximum. That is, the microcomputer 1 stores an appropriate heating time according to the amount of water.

After the operation of storing the data to the microcomputer has been completed, the microcomputer 1 controls the heating of the water at a step S4, and determines whether or the water is heating continuously, at a step S5. As a result, if water is heating, that is, YES, the procedure is proceeded to a step S6. Subsequently, the microcomputer 1 determines whether or not the minimum heating time, H-time is zero, at the step S6. Here, if the result of the determination is NO, that is, if the H-time is not elapsed yet, the microcomputer 1 outputs the high output signal to the inverter controlling portion 30 so that water is heated in a desired state for a remaining time while counting H-time continuously, at a step S7. Therefore, the high voltage is supplied to the primary of the transformer 40-2 in the inverter power supply portion 40 and the magnetron 50 produces the high output to perform the high output heating function at a step S8.

If the H-time has been elapsed and a remaining time is zero, that is, YES, the procedure proceeds to a step S9, the microcomputer 1 determines whether or not the remaining time obtained by subtracting the minimum heating time (H-time) from the maximum heating time (L-time) is zero. As a result, if the time is zero, that is, YES, the heating of the water is completed. On the contrary, if the remaining time is not elapsed, that is, NO, the procedure is proceeded to a step S10. At the step S10, the microcomputer 1 determines the remaining time and controls the performance of the low output heating function at a step S11. Accordingly, water will be heated in an appropriate condition. That is, the microcomputer 1 outputs the low output signal to the inverter controlling portion 30 so that the primary of the transformer 40-2 in the inverter power supply portion 40 is supplied with a low voltage and thus the magnetron 50 produces the low output.

As described above, according to the coffee heating method of the present invention, the microcomputer 1 controls the heating of the water in the optimum condition. Accordingly, the heating condition of water can be controlled automatically without an artificial handling, thereby achieving an effect that the preparation of tasty coffee can be facilitated.

While the present invention has been described with reference to a particular embodiment, it should be apparent to one skilled in the art that many changes and modifications may be made without departing from the spirit and scope of the invention as defined in the claims.

What is claimed is:

1. A coffee heating method comprising the steps of:
   setting a minimum heating time and a maximum heating time in a microcomputer
   controlling a microwave generating means having a rated voltage, via said microcomputer connected to said microwave generating means, to heat water in a container so as to pass through coffee grounds for making coffee at a high output level for the minimum heating time when an amount of water is at a first level in said container and an input voltage of the microwave generating means is detected to be at a maximum relative to the rated voltage;

alternatively, controlling said microwave generating means having a rated voltage, via the microcomputer, to heat water in a container so as to pass through coffee grounds for making coffee at a low output level for the maximum heating time when the input voltage of said microwave generating means is detected to be at a minimum relative to the rated voltage and an amount of water is at a second level higher than said first level in said container, whereby the heating condition of the water can be always maintained appropriately depending on the level of water in said container and the input voltage of said microwave generating means.

2. The coffee heating method according to claim 1, wherein said microcomputer stores the minimum and maximum heating time after a coffee heating key has been depressed.

3. The coffee heating method according to claim 1, wherein said maximum and minimum heating time depends on the amount of water and coffee powder and is stored into said microcomputer by using a key input portion.

4. A liquid heating method comprising the steps of:
setting a minimum and maximum heating time in a microcomputer;
controlling a microwave generating means having a rated voltage, via said microcomputer connected to said microwave generating means, to heat the liquid in a container by using a high output of said microwave generating means for the minimum heating time when the amount of the liquid is at a first level in said container and an input voltage of said microwave generating means is detected to be at a maximum relative to the rated voltage;

alternatively, controlling said microwave generating means having a rated voltage, via said microcomputer to heat the liquid in a container by a low output of said microwave generating means for the maximum heating time when the input voltage of said microwave generating means is detected to be at a minimum relative to the rated voltage and the amount of liquid is at a second level higher than said first level in said container, whereby the heating condition of the liquid can be always maintained appropriately depending on the level of water in said container and the input voltage of said microwave generating means.

5. The liquid heating method according to claim 4, wherein the liquid to be heated is water for making coffee.

6. The liquid heating method according to claim 5, wherein said microcomputer stores the minimum and maximum heating time after a coffee heating key has been depressed.

7. The coffee heating method according to claim 6, wherein said maximum and minimum heating time depends on the amount of water and coffee powder and is stored into said microcomputer by using a key input portion.

8. The coffee heating method according to claim 5, wherein said maximum and minimum heating time depends on the amount of water and coffee powder and is stored into said microcomputer by using a key input portion.

* * * * *